(12) United States Patent
Stringham

(10) Patent No.: US 7,394,558 B2
(45) Date of Patent: Jul. 1, 2008

(54) MODIFYING PRINTING BASED ON PRINT JOB CLUES

(75) Inventor: Gary Glen Stringham, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 920 days.

(21) Appl. No.: 10/352,686

(22) Filed: Jan. 28, 2003

(65) Prior Publication Data

US 2004/0145772 A1 Jul. 29, 2004

(51) Int. Cl.
*G06F 15/00* (2006.01)
*G06F 15/16* (2006.01)

(52) U.S. Cl. .................................. 358/1.15; 709/201

(58) Field of Classification Search ................ 358/1.15, 358/1.13, 1.14, 442, 403; 709/201, 200, 709/223, 203, 229; 400/61–62, 76; 705/14, 705/400; 270/12, 44; 710/19
See application file for complete search history.

(56) References Cited

U.S. PATENT DOCUMENTS

| | | | |
|---|---|---|---|
| 5,524,085 A | 6/1996 | Bellucco et al. | |
| 5,718,520 A | 2/1998 | MacKay | |
| 5,873,659 A | 2/1999 | Edwards et al. | |
| 5,999,945 A | 12/1999 | Lahey et al. | |
| 6,145,031 A | 11/2000 | Mastie et al. | |
| 6,173,295 B1 | 1/2001 | Goertz et al. | |
| 6,184,996 B1 | 2/2001 | Gase | |
| 6,633,395 B1 * | 10/2003 | Tuchitoi et al. ............ 358/1.14 |
| 6,687,776 B2 * | 2/2004 | Reilly ......................... 710/104 |
| 2002/0113993 A1 * | 8/2002 | Reddy ....................... 358/1.15 |
| 2002/0114004 A1 | 8/2002 | Ferlitsch | |

FOREIGN PATENT DOCUMENTS

GB 2354622 3/2001

OTHER PUBLICATIONS

Apple Computer, Inc. "About the Mac OS X Printing System; Inside Mac OS X", Mar. 2002; 54 pages.
Apr. 21, 2004 Search Report for GB Application No. 0400254.9.

* cited by examiner

*Primary Examiner*—Saeid Ebrahimi Dehkordy

(57) ABSTRACT

A computer can transmit information about a print job to one or more printers. The computer can transmit the information to the one or more printers prior to transmitting the print job to the printer. The information can be used to indicate to the one or more printers various aspects of the print job.

22 Claims, 10 Drawing Sheets

260 ⤵

| Job ID | Pgs | Status |
|---|---|---|
| PC3541-32 | 2 | Done |
| *Linux3-125 | 2/4 | Printing |
| PC3541-33 | 4 | Incoming |
| Mac358-21 | 152 | Waiting |
| PC3541-34 | 5 | Waiting |

Acct LJ4500: There are 3 jobs for a total of 11 pages in process and the printer is printing.

Bobs LJ2200: There are 5 jobs for a total of 52 pages and the printer is jammed.

Labs LJ8000: There are no jobs and the printer is ready.

Amys LJ2200: There are no jobs but your job requires A4 paper which is not loaded.

*Fig. 6*

| Printer | Current Jobs in Queue | Time to do Queued Jobs | Time to do 20 Monochrome Pages | Time to Completion |
|---|---|---|---|---|
| LaserJet 4550 | 6 color pages | 1:30 (@ 4PPM color) | 1:15 (@ 16PPM Mono) | 2:45 |
| LaserJet 8100 | 100 monochrome pages | 2:00 (@ 50PPM) | 0:24 (@ 50PPM) | 2:24 |

Fig. 7

MODIFYING PRINTING BASED ON PRINT JOB CLUES

TECHNICAL FIELD

This invention relates generally to printers and printing, and more particularly to modifying printing based on print job clues.

BACKGROUND

As computer technology has advanced so too has the technology of peripheral devices used in conjunction with computers, resulting in such devices becoming increasingly popular. One such type of peripheral device is the printer, which is typically used to generate a hard copy of data stored electronically (e.g., on paper or other medium). Many current printers are designed to be connected directly to a network, such as a local area network (LAN). By using such "networked" printers, users of multiple different computers are able to share the same printer.

One problem experienced with printers, however, is that typically printers print the print jobs they receive in the order they receive the print jobs. This reduces the user-friendliness of the printer as it restricts the ability of the user to make any changes to the printing of his or her print job after the print job has been sent to the printer.

Thus, it would be beneficial to provide a way to alleviate this problem and improve the user friendliness of printers.

BRIEF DESCRIPTION OF THE DRAWINGS

FIG. 5 illustrates an exemplary presentation of status information regarding print jobs.

FIGS. 6 and 7 illustrate exemplary printer summaries.

DETAILED DESCRIPTION

Figure 1:
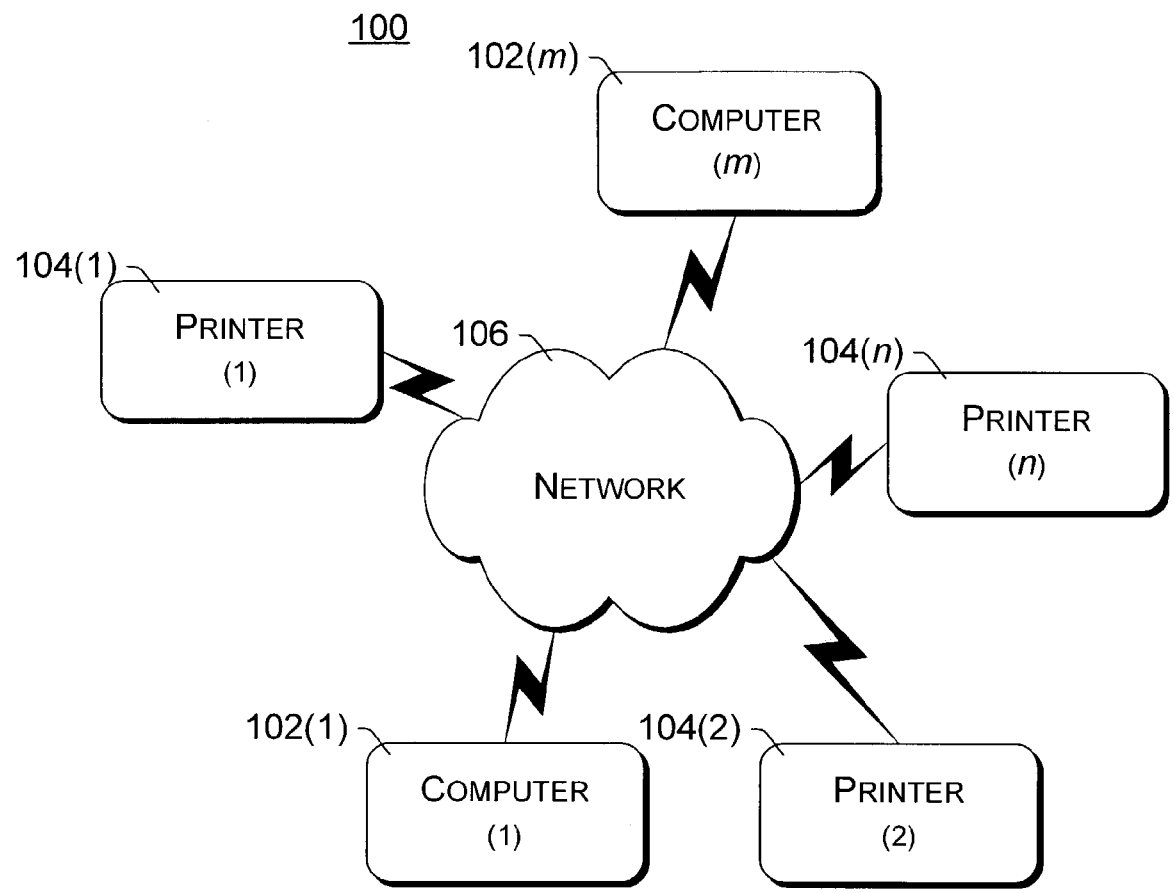
FIG. 1 illustrates an exemplary environment in which printers can be employed.

FIG. 1 illustrates an exemplary environment 100 in which printers can be employed. In environment 100, multiple (m) computers 102 are coupled to one or more of multiple (n) printers 104 via a network 106. Network 106 is intended to represent any of a variety of network topologies, types, and technologies (e.g., one or more of optical, wired, wireless, etc.), employing any of a variety of network protocols (including public and/or proprietary protocols). In one exemplary implementation, network 106 includes the Internet.

Computers 102 can be any of a variety of computing devices, including desktop PCs, workstations, server computers, notebook computers, Internet appliances, gaming consoles, handheld PCs, cellular telephones, personal digital assistants (PDAs), and so forth. Computers 102 can be the same types of devices, or alternatively different types of devices. Computers 102 can communicate print job clues and print jobs to printer(s) 104, as discussed in more detail below.

Printers 104 can be any of a variety of printing devices capable of generating a hard copy of data (e.g., received from one of computers 102). Printers 104 can generate hard copies of data in any of a variety of manners, such as by using toner (e.g., in laser printers), ink (e.g., in inkjet printers, bubble jet printers, dot matrix printers, etc.), heat applied to heat-sensitive print media (e.g., in thermal printers), and so forth. Printers 104 can be the same types of printing devices, or alternatively different types of printing devices. A printer 104 may also incorporate additional functionality. Examples of such additional functionality include the ability to scan hard copies of documents and generate digital representations of such documents, send and/or receive data as a facsimile machine, and so forth. Printers 104 can also include other types of printing devices, such as copiers, facsimile machines, multi-function machines (e.g., including facsimile, scanning, and printing capabilities), and so forth.

Figure 2:
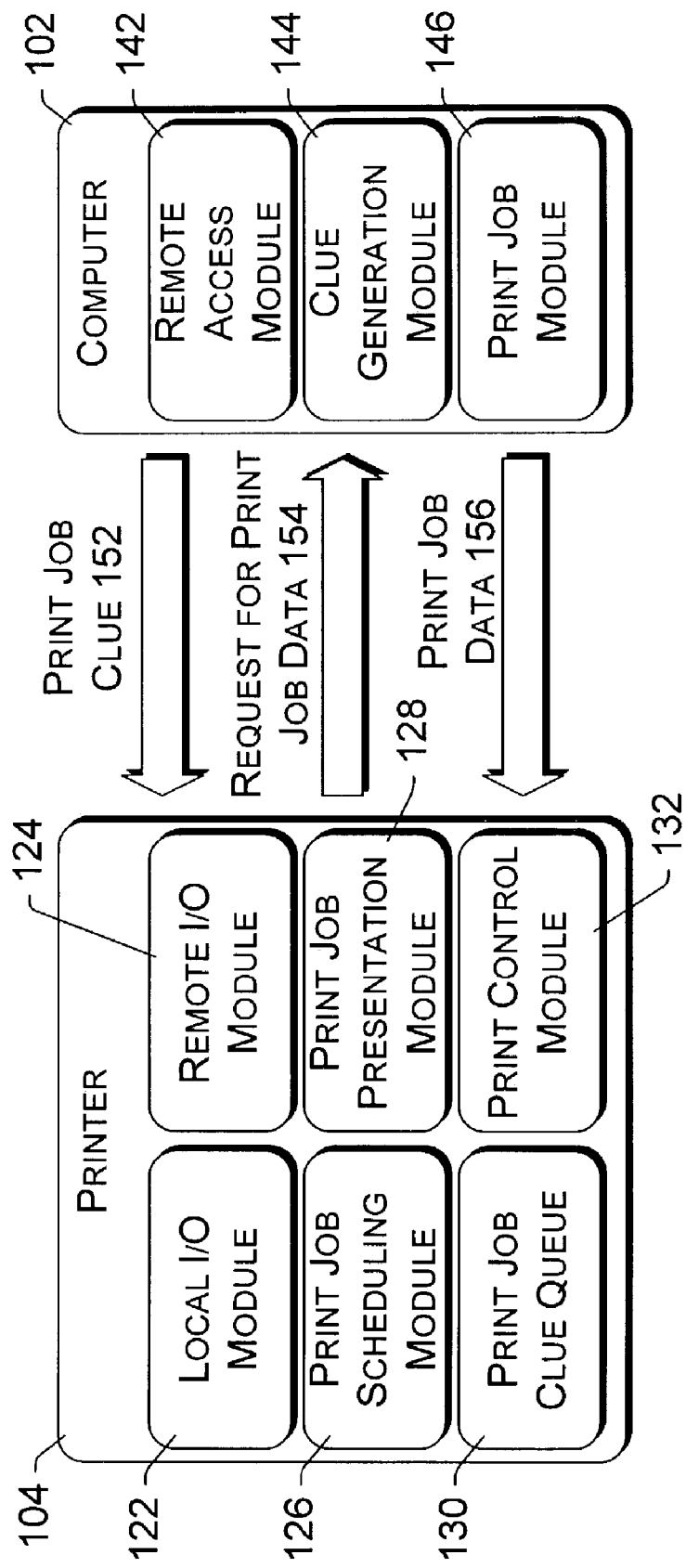
FIG. 2 is a block diagram illustrating an exemplary printer and computer in additional detail.

FIG. 2 is a block diagram illustrating an exemplary printer 104 and computer 102 in additional detail. Printer 104 includes several modules or components: a local I/O module 122, a remote I/O module 124, a print job scheduling module 126, a print job presentation module 128, a print job clue queue 130 and a print control module 132. The modules and components in FIG. 2 are exemplary only; the exact modules and components included in any particular printer can vary based on the type of printing device and the desires of the printer manufacturer.

Local I/O module 122 controls the local input of commands and/or data to printer 104. In one implementation, printer 104 includes a display (e.g., LED screen, LCD screen, etc.) via which prompts and information can be displayed to a local user of printer 104, and an input mechanism (e.g., touchscreen, keypad, etc.) via which the local user can input commands and/or data to printer 104. A "local user" refers to a user that accesses a printer by interacting with the local input mechanism of the printer. Local I/O module 122 includes the hardware for local input and output (e.g., display screen, keypad, etc.), as well as control circuitry or instructions (e.g., implemented in hardware, software, firmware, or a combination thereof) to control the local input and output of commands and/or data.

Remote I/O module 124 manages communication between printer 104 and one or more remote devices (e.g., via network 106 of FIG. 1). In one implementation, remote I/O module 124 includes circuitry to transmit and receive signals via a wired and/or wireless network connection. Remote I/O module 124 includes the hardware for remote input and output as well as control circuitry or instructions (e.g., implemented in hardware, software, firmware, or a combination thereof) to manage communications with various computers or other devices via the hardware.

Print job scheduling module 126 controls the scheduling of print jobs on printer 104, and determines when print jobs will be printed. The order in which print jobs are printed can vary based on a variety of different factors, as discussed in more detail below. Print job scheduling module 126 monitors the available memory in printer 104 to determine when the next print job should start being received (this typically occurs prior to the current print job being completed). By starting to receive a next print job before the current print job is completed printing, the amount of time that print control module 132 is idle is reduced.

Print job presentation module 128 manages the presentation of information regarding print jobs to users. Print job presentation module 128 can present information regarding print jobs that have already been printed by printer 104, print jobs that are being printed by printer 104, as well as print jobs that are to be printed by printer 104 in the future. Presentation module 128 can present this information either locally through local I/O module 122, or alternatively by causing remote computer(s) to present the information. The information may be transmitted to the remote computer via remote I/O module 124.

Queue 130 maintains print job clues that are sent to printer 104. A "print job clue" refers to certain information regarding a print job. A print job clue, however, is not embedded in the print job itself and can be transmitted as well as processed independently of the print job. Each print job clue sent to printer 104 includes information describing the print job associated with the clue. The clues are kept in queue 130, which can be accessed by print job scheduling module 126 to determine an order in which print jobs are to be printed, as well as by print job presentation module 128 in order to present information about the print jobs.

Print job clues may be maintained in queue 130 for different amounts of time after the jobs associate with the clues are printed. The amount of time that print job clues are maintained (after the associated print jobs are printed) in queue 130 can be time-based (e.g., keep the clue for 72 hours after the associated print job has been printed, keep the clue for one month after the associated print job has been printed, empty the queue every Monday morning at 2:00 am regardless of how many clues are in the queue, etc.) or size-based (e.g., keep no more than 100 clues in the queue, keep no more than 256 Kb of data in the queue, etc.), or a combination of time-based and size-based. In one implementation, print job scheduling module 126 is responsible for removing clues from the queue. Alternatively, another component or module may have this responsibility.

Print control module 132 manages the printing of data (e.g., the print jobs) by printer 104 in order to generate a hard copy of the data. Print control module 132 prints the print jobs in whatever order is dictated by print job scheduling module 126.

Computer 102 also includes several modules or components: a remote access module 142, a clue generation module 144, and a print job module 146. The modules and components of computer 102 are exemplary only; the exact modules and components included in any particular computer can vary based on the type of computing device and the desires of the computer manufacturer.

Remote access module 142 allows computer 102 to access printer 104 (through remote I/O module 124). Remote access module 142 may obtain information regarding print jobs from printer 104, or alternatively other data as discussed in more detail below. Remote access module 142 follows a communication protocol known to printer 104 (or known to at least remote I/O module 124) in accessing printer 104. This communication protocol may be public or proprietary. In one implementation, remote access module 142 is a conventional web browser that can be used to browse web pages (e.g., written in HTML (HyperText Markup Language)), typically using HTTP (HyperText Transfer Protocol). An example of such a web browser is the Microsoft® Internet Explorer browser, available from Microsoft® Corporation of Redmond, Wash. In accordance with this implementation, printer 104 includes an embedded web server (e.g., as part of print job presentation module 128) that can be accessed by the web browser, and a web page(s) containing the desired information (or references or links to the desired information) retrieved from the web server. Alternatively, other non-web based communication protocols can be used.

Clue generation module 144 generates print job clues to be sent to printer 104. Each print job clue includes information describing the print job that is associated with the clue. The exact information included in a particular print job clue can vary by implementation, as discussed in more detail below. In one implementation, clue generation module 144 is part of a printer driver on computer 102 that is specific to printer 104.

Print job module 146 generates print jobs to be sent to printer 104. Print job module 146 generates a print job in response to a request from another application (not shown) executing on computer 102 to print a document, file, or other electronic data. The print job includes print job data that describes to printer 104 exactly what is to be printed. In one implementation, print job module 146 is part of a printer driver on computer 102 that is specific to printer 104 and formats the print job data in a manner expected by printer 104.

Any communications regarding print jobs and printing, including the print job clues, are communicated between printer 104 and computer 102 in the absence of any other devices between printer 104 and computer 102 that are necessary for the printing process. For example, no print spooler devices or print servers need be situated between printer 104 and computer 102 in order to use print job clues and carry out the processes described herein. In some implementations, however, such devices may be utilized. It should also be noted that additional network hardware may be situated between printer 104 and computer 102 in order to enable communication between printer 104 and computer 102 (e.g., routers, gateways, bridges, hubs, switches, and so forth).

Generally, during operation, when an application on computer 102 desires to print data, the application initiates a print request. In response to the print request, clue generation module 144 generates a print job clue 152 that is communicated to printer 104. Print job scheduling module 126 determines when it needs to start receiving the print job data for the print job, and sends a request 154 for the print job data to computer 102 so that it will receive the print job data at approximately the time it has determined it needs to. In response to this request, print job module 146 sends the print job data 156 to printer 104 for printing. It should be noted that the print job clue 152 sent to printer 104 is associated with the print job, but it is independent of the print job data 156. Additionally, the print job clue 152 is sent to printer 104 prior to the sending of the print job data. It should further be noted that the amount of time that transpires between sending of the print job clue 152 and the print job data 156 can vary widely in practice depending on when print job scheduling module 126 schedules the print job for printing.

A print job clue can include different fields each for providing specific information about the associated print job. Table I below includes various fields that may be included in a print job clue.

TABLE I

| Field | Description |
| --- | --- |
| Job ID | Name or identifier of the print job. |
| Computer ID | Name or identifier of the computer that is the source of the print job. |

TABLE I-continued

| Field | Description |
|---|---|
| Job Description | Description of the print job, such as the name of a file being printed as the print job, a text description entered by the user, etc. |
| Total Page Count | Total number of pages in the print job, factoring in how many copies are to be printed (alternatively, number of copies may be a separate field). |
| Print Medium Size | Size of the print medium to be printed on (e.g., letter size, legal size, A4 size, etc.). |
| Print Medium Type | Type of print medium to be printed on (e.g., paper, transparency, postcard, envelope, etc.). |
| Output Component(s) | Any post-printing processing components to be used for the print job (e.g., a particular output bin, a sorter, a stapler, etc.). |
| Print Quality | The quality of printing to be used (e.g., draft quality, normal quality, premium quality, photo quality, etc.). |
| Monochrome/Color | Indication of whether the print job is to be printed in color or grayscale. |
| Duplex/Simplex | Indication of whether the print job is to be printed in duplex (double-sided) or simplex (single-sided). |
| Password | A password associated with the print job. The password can be used to password protect the print job so that certain actions (e.g., printing, canceling, marking urgent, etc.) can only be taken if the appropriate password is entered. |
| Urgent | Indicates whether the print job is marked as "urgent" and thus is to receive preferential treatment (e.g., printed before any other non-urgent print jobs). |

In different implementations, clue generation module 144 can be configured to include different fields in the print job clues it generates. The information included in a particular print job clue may be obtained from the printer driver when the print request is submitted at computer 102. For example, when the user selects a "print" option from an application on his or her computer 102, the printer driver can present to the user different print options (e.g., a window or screen allowing him or her to select a print quality, select a number of copies of his or her document or file to be printed, select which printer 104 he or she wants to send the print job to, select a password to use, and so forth). When the user has selected the print options he or she desires (which may simply be default print options), the printer driver saves these print options as part of the print job. Clue generation module 144 can retrieve these saved print options and include them in the print job clue that it generates. In alternative implementations, the clue generation module 144 may obtain this information in other ways.

In one implementation, clue generation module 144 generates a job ID and includes the job ID in a clue. The job ID can be generated in a variety of manners, but should uniquely identify the print job associated with the clue. The job ID may be designed to uniquely identify the print job over a particular timeframe (e.g., one week or a hundred years), after which the job ID may be re-used, or alternatively for a particular number of print jobs (e.g., module 144 may cycle through 65,000 different identifiers). Alternatively, the job ID may be assigned by another component of the printer driver, or may be modified by the user as discussed in more detail below.

The information in the print job clues received by printer 104 may be used by printer 104 in a number of ways. Exactly how this information is used can vary by implementation as well as what information is included in the clues. For example, printer 104 can use this information to:

a) present to a user an indication of those print jobs that have been printed and/or are waiting to be printed;
b) estimate a time to complete a print job that is presently being printed and/or is waiting to be printed; and/or
c) determine an order that pending print jobs are to be printed.

Figure 3:
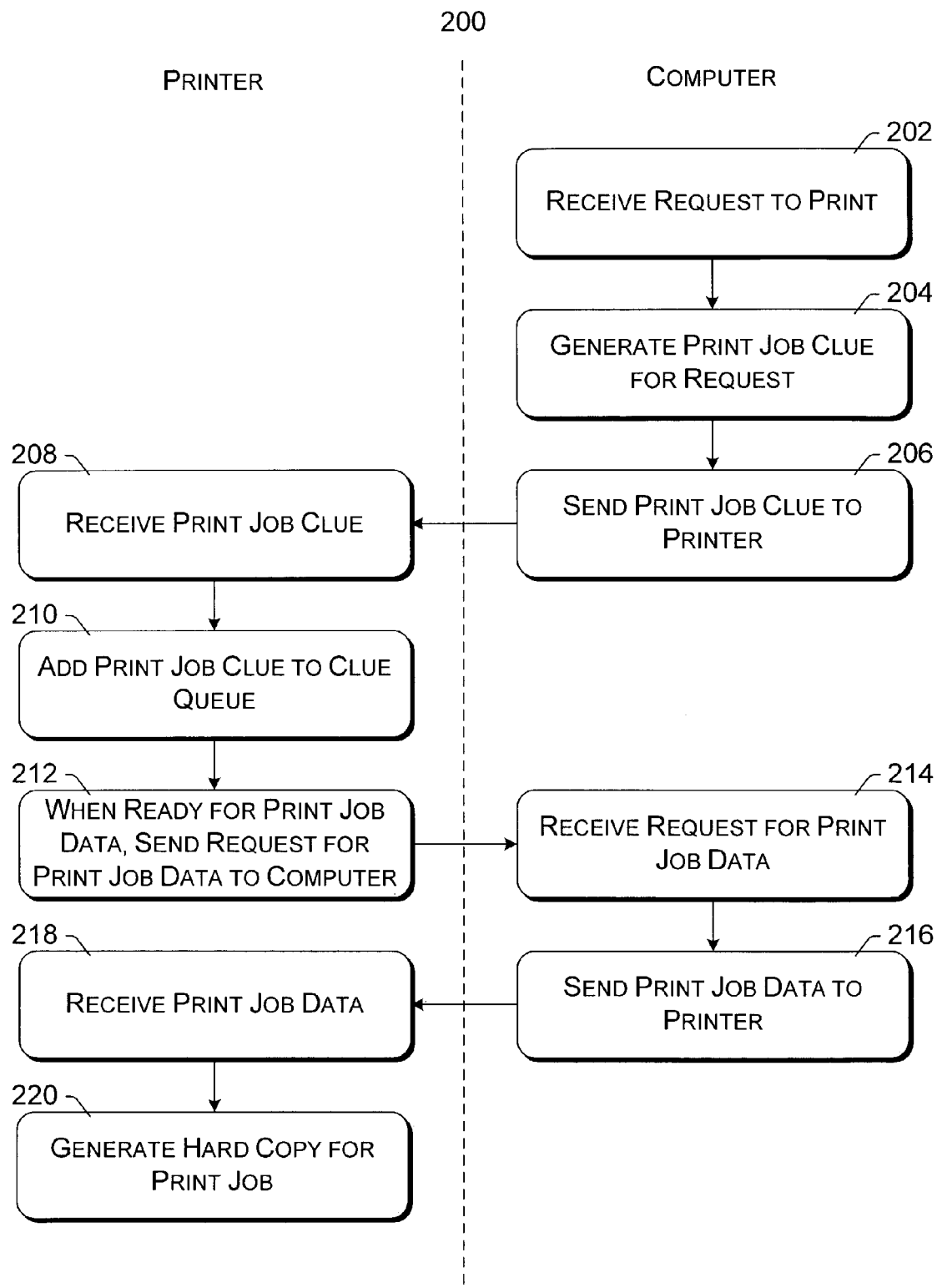
FIG. 3 is a flowchart illustrating an exemplary process for printing using print job clues.

FIG. 3 is a flowchart illustrating an exemplary process 200 for printing using print job clues. Acts illustrated on the left-hand side of FIG. 3 are performed by a printer (e.g., printer 104 of FIGS. 1 or 2), and the acts illustrated on the right-hand side of FIG. 3 are performed by a computer (e.g., computer 102 of FIGS. 1 or 2). Process 200 can be implemented in software, firmware, hardware, or combinations thereof.

Initially, a print request is received at the computer (act 202), typically from an application executing on the computer. A print job clue that includes information describing the print job that results from the print request is generated for the print request (act 204) and sent to the printer (act 206). The printer receives the print job clue (act 208) and adds the print job clue to the print job clue queue (act 210).

When the printer determines that it is ready to begin receiving the print job data for the print job associated with the print job clue, the printer sends a request for the print job data to the computer (act 212). The printer typically includes a memory for buffering some print job data, so the printer can determine that it is ready to begin receiving the print job data for the print job before the printer is actually ready to begin generating the hard copy for the print job.

The computer receives the request for the print job data (act 214). In response to the request, the computer sends the print job data to the printer (act 216). The printer receives the print job data (act 218) and generates a hard copy of the print job (act 220).

When the request for the print job data is sent in act 212, a mechanism may be employed so that printer 104 and computer 102 are both aware of what print job is being referenced. For example, in one implementation, the print job clue transmitted at step 206 includes a Job ID. The Job ID uniquely identifies (to both the printer 104 and the computer 102) the print job associated with the clue. The printer 104 includes the job ID in the request transmitted at act 212 in order to identify the print job that is being requested.

Alternatively, if printer 104 and computer 102 agree on a sequential order in which print job data is to be sent, then a unique job ID may not be included in the request in act 212. For example, printer 104 and computer 102 may agree (e.g., be pre-programmed with, or establish through a negotiation protocol) that the print jobs are to be transmitted by computer 102 to printer 104 in the same sequential order as the transmission order of the corresponding print job clues. Thus, in these implementations, the sequential order of the request transmitted at act 212, can inform the computer 102 which print job to send in response to the request. An additional mechanism may also be included to ensure that network delays do not result in the situation where a print job clue for one print job is received at printer 104 prior to receipt of a print job clue previously sent from the same computer 102. Such a mechanism could, for example, be to employ a 30-second delay between sending of print job clues.

Alternatively, other schemes could be employed that do not include sending of a request for the print job data to the computer (in act 212). For example, the computer could continually attempt to send the print job data to the printer, and the printer could refuse to accept the print job data until the printer determines it is ready to begin receiving that print job data.

The print job clue is received at printer 104 and the information describing the print job, which is included in the print job clue, is maintained at printer 104. The print job clue itself may be saved in queue 130 of printer 104, or alternatively the information describing the print job may be extracted from the print job clue and saved (e.g., in a different data structure or format) in queue 130. The saving of information describing the print jobs can be performed by print job scheduling module 126 or alternatively another component or module of printer 104. As will be described in greater detail below, the printer 104 may, at the request of a user, present this information to the user.

The printer 104 may operate (either automatically or at the direction of a user) to modify a clue after the clue is stored in queue 130. For example, a status indicator and additional descriptor (e.g., describing the reason(s) why a particular status indicator was assigned) may be added to the original information included in the clue. The status indicator may be updated over time by, for example, the print job scheduling module 126 as the status of the print job associated with the print job clue changes. By way of another example, the printer 104 may operate to modify a print job clue to indicate the associated print job is "urgent" after the clue is added to queue 130.

It should be noted that printer 104 may operate in an environment where one or more computers 102 are not aware of, and thus do not generate, print job clues. For ease of discussion, this general class of computers may be referred to herein as "legacy" computers.

It is noted that a network computer may be configured to, prior to transmitting a print job to a printer, first check if the printer is ready to receive the print job. The computer may check if the printer is ready to receive a print job by sending, to the printer, a "print job request". If the printer accepts the print job request, this informs the computer that the printer is ready to receive the print job. In response, the computer may then transmit the print job to the printer.

If, however, the printer does not accept the print job request, this informs the computer that the printer is not ready to receive the print job. In response, the computer delays sending the print job to the printer. The computer may then proceed to periodically send a print job request to the printer until the printer indicates, by accepting a print job request, it is now ready to receive the print job. Once the printer accepts a print job request, the computer then sends, to the printer, the print job.

In one implementation, printer 104 may simply ignore any print job request that is received from a legacy computer.

Alternatively, the printer 104 may generate a "ghost" print job clue in response to receiving a print job request. After generating the ghost print job clue, the printer 104 may then maintain the ghost print job clue in the print job clue queue 130. Printer 104 may not, however, immediately accept the request from the legacy computer.

The printer 104 may generate the ghost print job clue using certain default values in place of actual values that are not immediately known. For example, the printer 104, upon initially receiving the print job request, may not know one or more of the following: a) the total page count of the print job, b) the print medium size that is to be used to print the print job, and/or c) the print quality setting that is to be used to print the print job. The printer 104, however, may be able to determine some or all of these values while it is processing the print job (and/or after the printer 104 has completed the print job). Once actual values are determined, the printer 104 may replace the corresponding default values with the actual values.

For example, printer 104 may determine the actual total page count, actual print medium size and actual print quality specified by a print job sometime after the print job is received from a legacy computer. After actual values are determined, the printer 104 may then proceed to update the ghost print job clue so as to replace default values with the determined actual values.

It is noted that a ghost print job clue may be maintained after the processing of the associated print job is completed. Furthermore, the printer 104 may allow the user to modify ghost print job clues before printing of the associated print job, and/or view ghost print job clues before, during, or after printing of the associated print job.

Print job scheduling module 126 may schedule print jobs that are received from legacy computers in a similar manner as those print jobs that are received from non-legacy computers. A legacy computer, for example, may repeatedly attempt to send a print job request to printer 104. Upon receiving such a print job request from a legacy computer, the printer 104 may or may not accept the print job request. The legacy computer continues to attempt to send the print job request to printer 104. Once the printer 104 determines it is time to accept the print job, however, the printer 104 responds by accepting the next print job request received from the legacy computer. When printer 104 accepts the request, the legacy computer then transmits the print job to the printer 104. Upon receiving the print job, the printer 104 proceeds to print the job.

Figure 4:
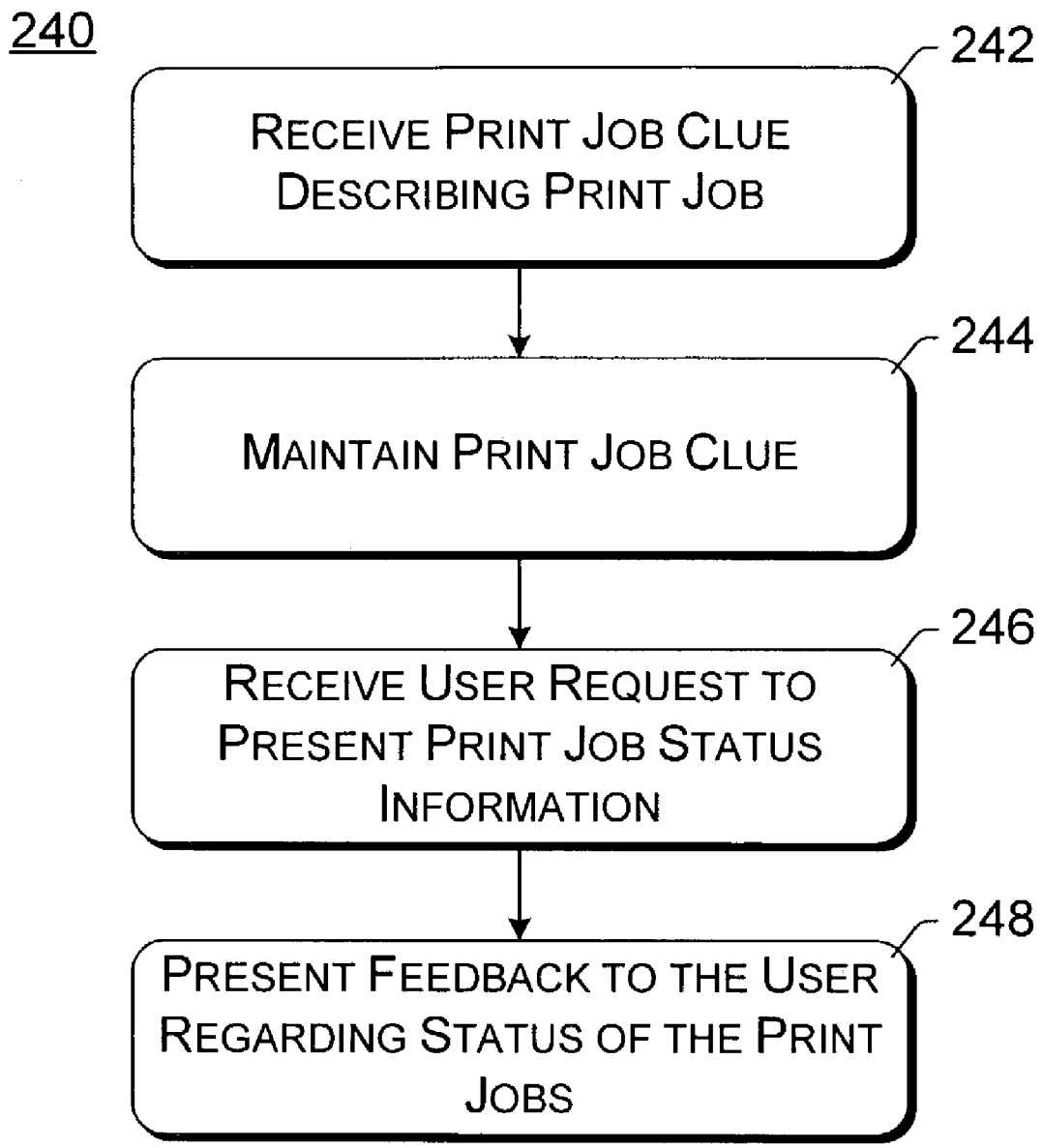
FIG. 4 is a flowchart illustrating an exemplary process for presenting information regarding a print job.

FIG. 4 is a flowchart illustrating an exemplary process 240 for presenting information regarding a print job. The acts of Process 240 may be performed by a printer, or a combination of a printer and a computer. Process 240 can be implemented in software, firmware, hardware, or combinations thereof.

Prior to a printer receiving a print job, a print job clue describing the print job is received at the printer (act 242) and maintained at the printer (act 244). Subsequently, a user may input a request to present the status information for the print job. The user request is received at act 246. This request may be received from the user locally at the printer, and/or through a remote computer coupled to the printer (e.g., via network 106 of FIG. 1).

In response to the user request, the status of the print job is presented to the user (act 248). Typically the feedback is presented to the user at the same location as the location that the user inputs the request (e.g., locally at the printer or at the remote computer).

The status information that is presented to the user for the print job can vary by implementation. If the print job has yet to be received by the printer, the status information may indicate when the print job will be received by the printer. If the print job is presently being printed, the status information may indicate how many pages of a print job remain to be printed; how many pages of a print job have already been printed; an estimated time to print the print job, etc. How an "estimated time to print" may be generated is discussed in more detail below. The job status information may also provide information regarding other print jobs that either have been printed, have yet to be printed and/or are waiting to be printed.

In some implementations, the job status presented at act 248 may be in the form of one or more pre-defined status indicators. Table II below includes various status indicators that may be used. It should be noted that the status indicators of Table II are exemplary only, and that only some of the status indicators of Table II may be used in some implementations, and additional status indicators (not shown in Table II) may be used in other implementations.

TABLE II

| Status Indicator | Description |
| --- | --- |
| Done | The print job has finished printing. |
| Printing | The hard copy of the print job is currently being produced. |
| Incoming | The print job is being received at the printer from the computer, but the hard copy has not yet been produced. This includes print jobs that have been received at the printer but have not yet begun printing (e.g., the print job data is queued in the printer's memory). Alternatively, another status indicator may be used (e.g., "queued") for the print jobs that have been received at the printer but have not yet begun printing. |
| Waiting | Receipt of the print job data from the computer has not yet begun. |
| Deferred | Printing of the print job has been deferred. May also optionally include an indication of why the print job was deferred (e.g., proper print medium type or size needs to be added to an input tray of the printer, staples need to be added to the stapler component, the output bin is full, a password needs to be entered, etc.). |
| Error | An error occurred while printing the print job. Note: In some implementations, this indicator may also include an indication of the error that occurred (e.g., a paper jam, memory overflow, printer couldn't keep up with the print data, etc.). |
| Canceled | The print job was canceled. |
| Urgent | The print job is marked as urgent. |

FIG. 5 illustrates an exemplary presentation of job status information. As illustrated in FIG. 5 the display 260, indicates, for each print job, the job ID, total number of pages in the job, and a status indicator. As seen in display 260: the print job having a job ID of "PC3541-32" was 2 pages and has already been printed; the print job having a job ID of "Linux3-125" is four pages long, two of the four pages have already been printed, and the job is currently printing (the currently printing job is also denoted using an asterisk); the print job having a job ID of "PC3541-33" is four pages long and is being received at printer 104; the print job having a job ID of "Mac358-21" is 152 pages long and is waiting to be printed; and the print job having a job ID of "PC3541-34" is five pages long and is waiting to be printed. It should be noted that the number of pages in the jobs waiting to be printed may be known to the printer because of the print job clue information as the print job itself has not yet been received.

Thus, for example, the printer 104 may be configured to accept a user request, via the printer's control panel, to present print job status information. In response to the request, the printer 104 may display print job status information as illustrated by FIG. 5.

It is noted that the printer 104 may list the job status information in the same order in which jobs are scheduled for printing (for jobs not yet printed) and in the same order in which the jobs were printed (for jobs that have already been printed). For example, the display 260 of FIG. 5 indicates there are several jobs scheduled for printing ahead of the job having a job ID of "PC3541-34". Alternatively, other orderings may be used, such as orderings based on criteria input by the user (e.g., a user request to sort the job status information alphabetically by job ID).

It is noted that a user may be given the option to request job status information be displayed to him or her via a remote computer 102 (which may be, but need not be, the same computer 102 from which he or she sent his or her print job).

It is also noted that a user may not want information regarding his or her print job to be presented to other users. In order to address this type of situation, a print job clue may include a "private" field that can be set (e.g., to "yes") at the option of the user. A print job clue that includes a "set" private field indicates that the job status information for the corresponding print job is to be classified as "private" The print job presentation module 128 may be configured so as not to present job status information that is classified as "private".

In some implementations, the job status information of all print jobs from a particular user or from a particular computer may, by default, be classified as "private". Such a default may be programmed into, for example, either the presentation module 128 of printer 104 or the clue generation module 144 of computer 102.

A user may also be presented with a printer summary for one or more printers 104 prior to submitting his or her print request. The printer summary gives the user an indication of how soon his or her print job would be printed on each of one or more printers 104.

The user may request to be presented with such a printer summary, or alternatively computer 102 may automatically present the printer summary to the user. For example, when the user selects a "print" option from an application on his or her computer 102, the user can be presented with different print options (e.g., a window or screen allowing him or her to select a print quality, select a number of copies, select a particular printer 104 he or she wants to send the print job to, and so forth). At this point, the user can also be presented with the printer summary of one or more printers 104, thereby allowing the user to make a more informed decision as to which printer 104 he or she would like to use for his or her print job.

The information presented to the user as the printer summary prior to printing can vary, but should be sufficient to give the user some indication of how soon his or her print job would be printed on a particular printer 104. The information presented as the printer summary can also vary based on what information is available to printer 104 based on the information in the print job clues it receives. The information included in the printer summary can be generic printer information that is not particular to any particular print job (e.g., printer 104 is idle or jammed), or alternatively may be specific to the print job (e.g., the print job requires A4 paper and there is currently no A4 paper in printer 104).

The printer summary can be generated at printer 104, or alternatively the information may be gathered at printer 104 and sent to computer 102 for generation of the printer summary at computer 102. In order to generate a printer summary, computer 102 sends a request for the printer summary to each printer 104 on which the user may desire to print the print job. This request may be a print job clue with a particular field set that identifies the clause as a request for a printer summary. The printers to which the request(s) for the printer summary are sent may be identified by the user, or alternatively may be automatically detected by computer 102. For example, in the Microsoft® Windows® operating systems, a user can install various printers on his or her computer. These printers, once installed, can be automatically detected in a conventional manner by accessing the operating system.

In response to the request for the printer summary, printer 104 summarizes its current status and returns the summary to the requesting computer. The requesting computer can collect summaries from each of multiple printers and combine them for presentation to the user. In some situations, additional information regarding the print job may need to be sent to printer 104 before the printer can generate a printer summary (e.g., printer 104 would need to be informed by computer 102 that the print job will use A4 paper before printer 104 could make a determination that the print job could not be printed because the printer does not currently have A4 paper installed). Alternatively, all of the information regarding its current status (e.g., the information in the print job clues that are currently printing, currently incoming, and currently waiting to be printed; information regarding what type and size of print medium is currently installed; whether any post-printing processing components are currently operational (e.g., whether the stapler component has staples); etc.) is sent to the computer for the computer to summarize.

Examples of information that can be presented as part of the printer summary include: a current printer status (e.g., ready and idle (able to print but not currently printing), offline, printing, jammed, etc.); a total number of jobs that are printing, incoming, and/or waiting; a total number of pages that are to be printed from the print jobs that are currently printing, incoming, and/or waiting; whether the print medium type or size specified by the print job is available in the printer; and so forth.

Additional information that can be included in the printer summary is an estimated completion time. Printer 104 can be programmed (or alternatively calculate itself based on its past performance) with the performance characteristics of the printer. These performance characteristics include, for example, how quickly the printer can print monochrome and/or color print jobs, how quickly the printer can print on different types and/or sizes of print media, how quickly the printer can print when being fed print media from a particular input tray, how quickly a particular post-printing processing component (e.g., a sorter) can accept printed media, how quickly the printer can print in duplex and simplex modes, how quickly the printer can print with different print qualities (e.g., photo or draft quality), and so forth. Given the information in the print job clues, as well as these performance characteristics, printer 104 can readily calculate both an estimated amount of time it will take the printer to print a particular print job, and an estimated amount of time it will take the printer to print all print jobs that are currently printing, incoming, and/or waiting for the printer. Given these estimated amounts of time, printer 104 can readily calculate an estimated completion time for a particular print job (an estimated time when the print job is expected to be completed printing at the printer). This estimated completion time may be a relative value (e.g., the print job is expected to be done printing on the computer in 5 minutes and 37 seconds) or an independent value (e.g., the print job is expected to be done printing on the computer at 1:34 pm). This estimated completion time can be included in the printer summary, thereby allowing the user to make a choice of which printer to use based on the completion time rather than specific characteristics of the other print jobs already waiting or in process at the printer.

Alternatively, the estimated completion time may be generated by computer 102 rather than printer 104. In this situation, computer 102 could be programmed with the performance characteristics of the printer (e.g., in the printer driver corresponding to printer 104), or alternatively computer 102 may request (e.g., from the printer) the performance characteristics of the printer. Computer 102 would also obtain, from the printer, at least a portion of the printer's print job clue queue (including information on at least those jobs that have not yet been printed and that are currently being printed). Given these performance characteristics and print job clue(s), computer 102 can readily determine the estimated completion time in a manner analogous to that discussed above with respect to printer 104.

In one implementation, the request for the printer summary is a print job clue with an additional flag field set that identifies the clue as a request or query for the printer summary. The printer can optionally save such a print job clue so that if the computer 102 does subsequently send the associated print job to the printer, the print job's place in the queue 130 will already have been established. Saving such a print job clue also allows printer 104 to account for the print job associated with that clue when responding to requests for printer summaries from other computers. If the print job clues are saved, then each printer that the print job clue was sent to but that the print job will not be printed at (e.g., because the user selected a different printer) should be notified that it can delete the print job clue. Alternatively, printer 104 may drop any print job clue that is flagged as a request for a printer summary, after the appropriate summary and/or information is returned to the requesting computer 102, and not place any such print job clue into its queue 130.

The request for the printer summary may alternatively be implemented in different manners. For example, it may be a separate message that does not include a print job clue, or it may be a message that has embedded therein a print job clue.

It should be noted that a request for a printer summary may be sent to a printer even though the device sending such a request does not currently have any print jobs that it desires to send to the printer. For example, a system administrator may desire that printer summaries be displayed (or logged) at his or her computer at regular or irregular intervals. In order to generate such a display or log, the computer sends a request for a printer summary to each of the printers the system administrator desires, and then displays or logs the received summaries.

FIGS. 6 and 7 illustrate exemplary printer summaries. In FIG. 6, a display 270 is illustrated showing printer summaries for four different printers. As seen in display 270: the printer named "Acct LJ4500" is currently in the process of printing, and there are 3 jobs having a total of 11 pages to be printed; the printer named "Bobs LJ2200" is currently jammed, and there are 5 jobs having a total of 52 pages waiting to be printed; the printer named "Labs LJ8000" is currently ready to print and is not printing any pages; and the printer named "Amys LJ2200" is not currently printing any pages but it does not have any A4 paper loaded (which is required by the print job about to be submitted by the user). Additional information may also be included or conveyed by display 270. For example, display 270 may highlight a particular printer that is deemed to be the best (or better) to receive the user's current print job (e.g., because it is ready to print and is not printing any jobs, because it has the fewest number of pages or print jobs to be printed, because it currently has the correct print medium type and/or size for printing, etc.).

In FIG. 7, a display 280 is illustrated showing printer summaries for two different printers. As seen in display 280: the printer named "LaserJet 4550" currently has 6 color pages to be printed which will take approximately 1 minute and 30 seconds to print (at the printer's rate of 4 pages per minute (PPM)), and it would take the printer approximately 1 minute and 15 seconds to print the print job about to be submitted (which is 20 monochrome pages) at the printer's rate of 16 pages per minute, so the estimated time to completion for the printer is 2 minutes and 45 seconds. The printer named "LaserJet 8100" currently has 100 monochrome pages to be printed which will take approximately 2 minutes to print at the printer's rate of 50 pages per minute, and it would take the printer approximately 24 seconds to print the print job about to be submitted (which is 20 monochrome pages) at the printer's rate of 50 pages per minute, so the estimated time to completion for the printer is 2 minutes and 24 seconds.

Thus, it can be seen that the printer summaries allow the user to make a more informed decision as to which printer he or she would like to send a print job to. He or she can determine which printer is most likely to have the print job he or she is about to submit completed the soonest, based on the current characteristics of the printers (e.g., number of pages and/or jobs), and/or on the estimated time to completion.

Figure 8:
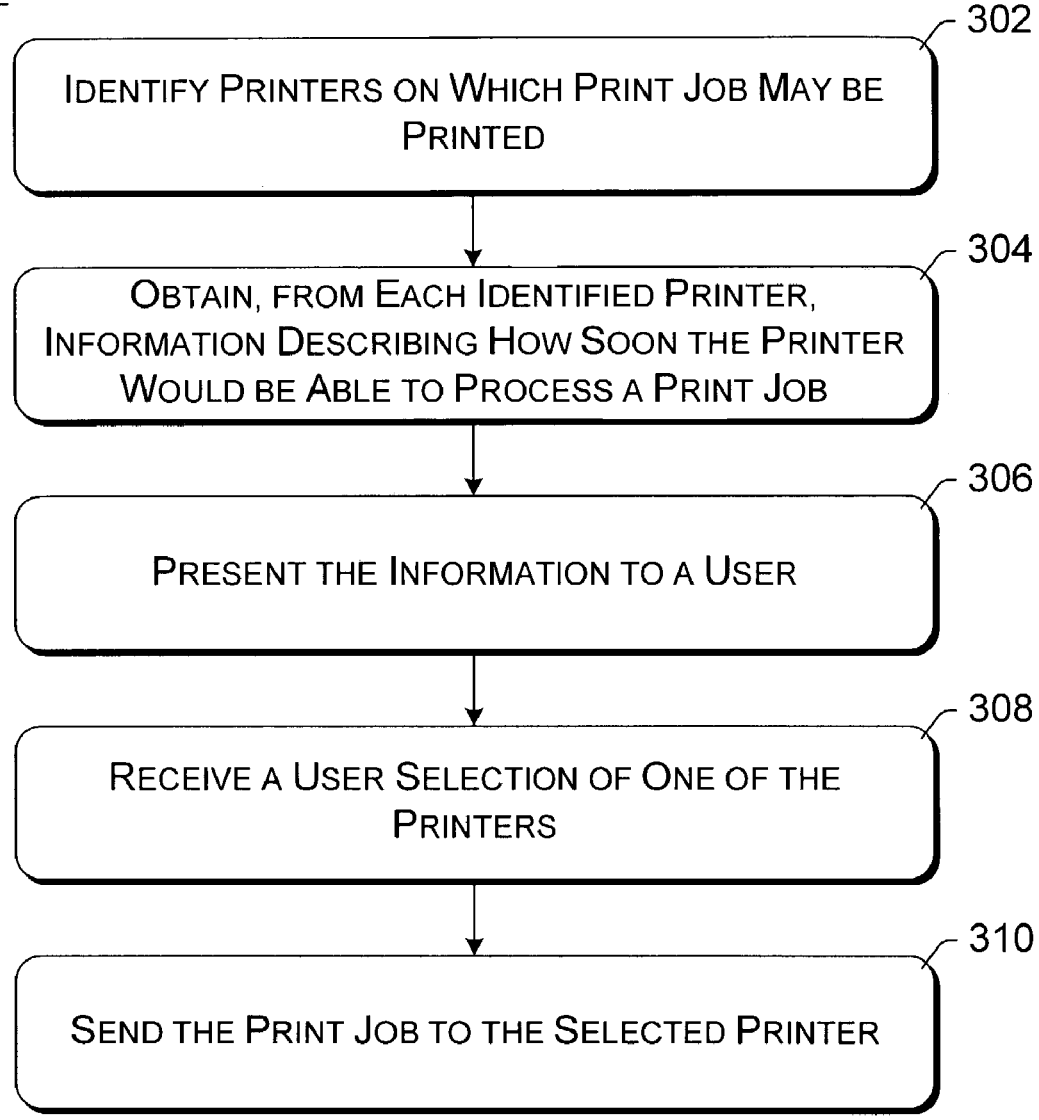
FIG. 8 is a flowchart illustrating an exemplary process for selecting a printer on which a print job is to be printed.

FIG. 8 is a flowchart illustrating an exemplary process 300 for selecting a printer on which a print job is to be printed. Process 300 may be performed in a printer, or a combination of a printer and a computer, and can be implemented in software, firmware, hardware, or combinations thereof.

Initially, the printers on which the print job may be printed are identified (act 302). This identification may be performed automatically, or alternatively may be made by the user. Information describing how soon the printer would be able to process a print job that is about to be submitted is then obtained from each identified printer (act 304). This information is then presented to the user (act 306), such as in a printer summary discussed above. A user selection of one of the printers is then received (act 308), and the print job is sent to the selected printer for printing (act 310).

Figure 9:
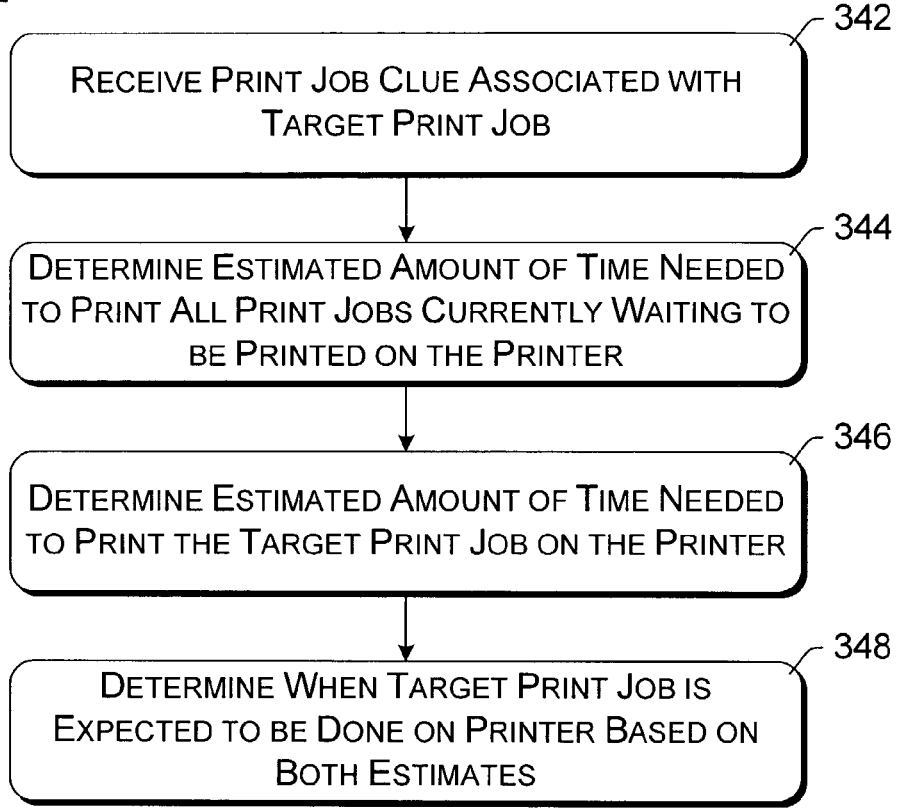
FIG. 9 is a flowchart illustrating an exemplary process for determining an estimated completion time for printing a job on a particular printer.

FIG. 9 is a flowchart illustrating an exemplary process 340 for determining an estimated completion time for printing a job on a particular printer. Process 340, in this example, is performed by a printer. Additionally, process 340 may be implemented in software, firmware, hardware, or combinations thereof. In one implementation, the estimated completion time generated by process 340 is at least part of the information presented to the user in act 306 of FIG. 8.

Initially, a print job clue is received by a printer (act 342). The print job clue includes information about a particular print job (target job) that is about to be submitted by a remote computer to the printer (act 342). An estimated amount of time needed to print all of the print jobs currently waiting to be printed on the printer is determined (act 344), and an estimated amount of time needed to print the target job is also determined (act 346).

It is noted that act 346 may be performed using the information included in the print job clue for the target job that was received at act 342. For example, the print job clue may indicate the print quality specified by the target job, whether the target job specifies color or grayscale printing, whether the target job specifies duplex or simplex mode printing, etc.

Act 346 may also be performed using certain pre-determined information about the printer itself. For example, if the print job clue indicates that the target job is to be printed in color, the printer can use this information along with pre-determined information regarding the speed at which the printer can print color pages in order to estimate the printing time of the target job.

A determination of when the target job would be done printing on the printer is then made based on the estimated amounts from acts 344 and 346 (act 348). Process 340 can then be repeated for each printer on which the print job may be printed.

Additionally, printing of print jobs can be modified based on the print job clues. Print job scheduling module 126 of printer 104 schedules print jobs for printing on printer 104. In one implementation, scheduling module 126 defers printing of any print job that cannot be printed by the printer as the printer is currently configured. The "current configuration" of the printer refers to its current resources (e.g., print media, toner, ink, etc.) as well as the functioning of its input trays, output bins, and any post-printing processing components. For example, if the printer has black ink but no color ink, then a color print job would be deferred whereas a grayscale print job would not be deferred. By way of another example, if the printer currently has letter size paper but no A4 paper, then a print job that specifies A4 paper would be deferred but a print job on letter size paper would not be deferred. By deferring printing of such print jobs, other print jobs that can be printed by the printer as currently configured are not delayed by those print jobs that cannot be printed due to the printer configuration.

Deferred print jobs on printer 104 are identified as being deferred (optionally with a reason as to why they are deferred, such as "no A4 paper in input tray", or "color ink cartridge is empty") when the print status for the printer is presented to a user. Additionally, print job scheduling module 126 may optionally return an indication of the deferment (through remote I/O module 124) to computer 102, optionally along with a reason as to why the print job was deferred (e.g., "no A4 paper in input tray", or "color ink cartridge is empty"). Computer 102, upon receipt of the indication, can notify the user of computer 102 (e.g., by presenting a dialog box, window, or other screen to the user) that the print job has been deferred by printer 104 (and optionally include a reason as to why the print job is deferred, such as "no A4 paper in input tray", or "color ink cartridge is empty"). This provides information to the user that his or her print job has been deferred, and allows the user to remedy the situation that caused the deferral.

The printing of print jobs can also be modified by print job scheduling module 126 reordering the print jobs. Scheduling module 126 may schedule print jobs to be printed based on a first come, first served model (that is, the print jobs are printed in the order their associated print job clues are received), or alternatively the print jobs may be ordered according to other scheduling models. This reordering refers to the print jobs being printed in an order other than the order in which their associated print job clues are received. Such reordering may be accomplished by scheduling module 126 reordering the print job clues in queue 130, or alternatively by scheduling module 126 simply selecting print jobs for printing in an order other than the order in which their associated print job clues are stored in queue 130. When reordering print jobs, scheduling module 126 reorders the print jobs based at least in part on the information in the print job clues associated with those print jobs.

Various scheduling models may be employed by scheduling module 126 in reordering the print jobs. Examples of such scheduling models include:

Give particular users priority (e.g., any print job from the CEO's computer has first priority, any print job from the Vice President's computer has second priority, and everyone else has third priority).

Smaller print jobs are printed first (e.g., based on total page count).

Print jobs that require less time to print are printed first.

Print jobs with a page count over a threshold (e.g., 100 pages) are deferred until evening (e.g., after 6 pm).

Group print jobs by print media size (e.g., do all legal size print jobs together, then all letter print jobs together, then all A4 print jobs together, etc.), by print media type (e.g., do all transparency print jobs together, then all paper print jobs together, then all envelope print jobs together, etc.), by color or monochrome printing, by duplex or simplex printing, by combinations thereof, and so forth.

Printing of print jobs may also be modified by canceling the print jobs. A print job can be canceled at virtually any time. A user can select a particular print job to cancel by inputting data describing the print job (e.g., the job ID) or by selecting the print job from a list of print jobs presented to the user. For example, the user could be presented with a list of print jobs on the control panel of printer 104 as discussed above, then scroll through the list and select a particular print job (e.g., by highlighting the print job using directional arrows on the control panel and pressing a "cancel" button). The selected print job is then removed from print job clue queue 130 by print job scheduling module 126. Alternatively, the selected print job may be left in print job clue queue 130 and recorded as being canceled (optionally indicating how many pages, if any, of the print job were printed prior to its being canceled). If the print job data has not yet been received from computer 102 (or has started to be received but all of it has not yet been received), then scheduling module 126 returns an indication of the canceling to computer 102 (e.g., print job module 146). This indication allows computer 102 to cancel the print job from its records (e.g., remove the print job from the computer's spooler).

Alternatively, computer 102 may not be notified of the cancellation. If computer 102 is not notified of the cancellation, printer 104 will eventually request the print job data from computer 102 (e.g., at the time the job would otherwise have been requested from computer 102 had it not been canceled). Upon receipt of the print job data from computer 102, the print job data is simply ignored by printer 104 and the data is not printed.

Canceling of a print job may also require a password. The password may be on a per-print job basis and supplied to printer 104 as part of the print job clue. The password may also be on a per-computer basis and supplied to printer 104 as part of the print job clue. Alternatively, the password may be specific to printer 104, such as a system administrator password. Thus, only individuals knowing the system administrator password would be able to cancel print jobs.

Figure 10:
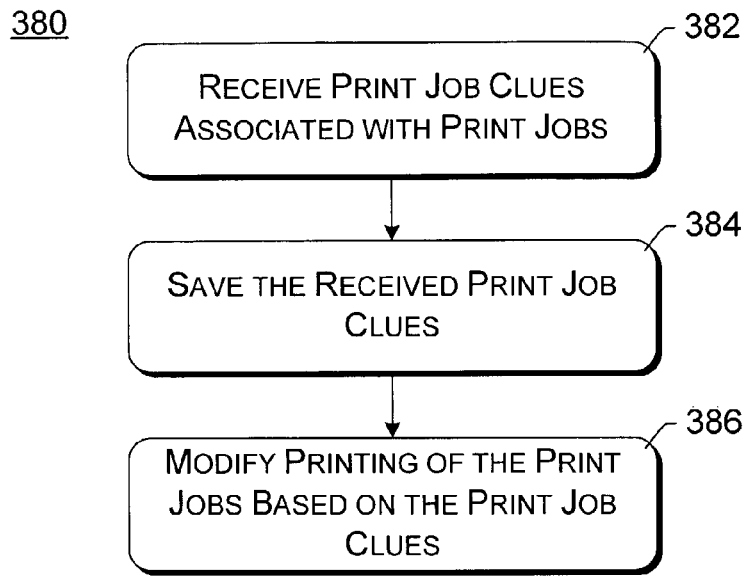
FIG. 10 is a flowchart illustrating an exemplary process for modifying printing of print jobs based on the print job clues.

FIG. 10 is a flowchart illustrating an exemplary process 380 for modifying printing of print jobs based on the print job clues. Process 380 may be performed by a printer and can be implemented in software, firmware, hardware, or combinations thereof.

Initially, print job clues associated with print jobs are received (act 382). The received print job clues are saved (act 384), and printing of the print jobs based on the print job clues is modified (act 386). This modification can include, for example, deferring print jobs, reordering print jobs, canceling print jobs, and so forth.

Various information in the print job clues may also optionally be customized by the user. Clue generation module 144 of computer 102, for example, may permit users to alter the print job clues it generates. For example, when the user selects a "print" option from an application on his or her computer 102, the user can be presented with different print options (e.g., a window or screen allowing him or her to select a print quality, select a number of copies, select printer 104 he or she wants to send the print job to, and so forth). At this point, the user can also be presented with one or more fields of other windows or screens via which he or she can customize the print job clues.

Clue generation module 144 optionally allows the user to customize print job clues by inputting a name for the print job (e.g., "Bob's Quarterly Sales"). The name input by the user can replace a default name created by clue generation module 144 (e.g., "Bob's Quarterly Sales" can replace "Linux3-125"). The name input by the user (e.g., using a keyboard at computer 102) is used as the job ID for the print job. Alternatively, the print job clue may maintain a separate job ID and job name, the job ID being a unique value that is used by computer 102 and printer 104, and the job name being the user-friendly identifier that is presented to the user. By allowing the user to enter a name for the print job, the user can more easily identify his or her print job when presented with a list of print jobs.

The customization of print job clues may be on a per-print job basis or alternatively on a per-computer or per-user basis. For example, clue generation module 144 may allow the user to enter a format for the job ID (e.g., "Gary's PC"). Clue generation module 144 then maintains a job counter that is incremented each time a print job clue is generated. This value of the job counter is then appended to the format to generate the job ID for a particular print job (e.g., "Gary's PC-1" for the first print job, "Gary's PC-2" for the second print job, and so forth).

A user may also optionally be allowed to customize print job clues by marking a particular print job as "urgent". Clue generation module 144 may allow the user to mark a print job as "urgent" (e.g., along with the other print options presented to the user when he or she selects "print" from an application). The "urgent" indication is then included in the print job clue sent to printer 104.

Alternatively, the user may be able to mark a print job as "urgent" after the print job clue has been sent to printer 104. A user can select a particular print job to be marked urgent by inputting data describing the print job (e.g., the job ID) or by selecting the print job from a list of print jobs presented to the user (either locally at the printer or from a remote computer). For example, the user could be presented with a list of print jobs on the control panel of printer 104 as discussed above, then scroll through the list and select a particular print job (e.g., by highlighting the print job using directional arrows on the control panel and pressing an "urgent" button). The selected print job is then marked as "urgent" by print job scheduling module 126.

Marking a print job as "urgent" causes print job scheduling module 126 to give the print job preferential treatment over other print jobs. A print job marked "urgent" may be printed before any other print job that is not marked "urgent" (if multiple print jobs are marked "urgent", they may be printed in first come, first served order, or alternatively according to some other ordering followed by print job scheduling module 126 discussed above). Alternatively, the "urgent" marking may be incorporated into the scheduling model used by print job scheduling module 126.

Marking a print job as urgent may optionally require a password specific to printer 104, such as a system administrator password. Thus, only individuals knowing the system administrator password would be able to mark print jobs as urgent.

Figure 11:
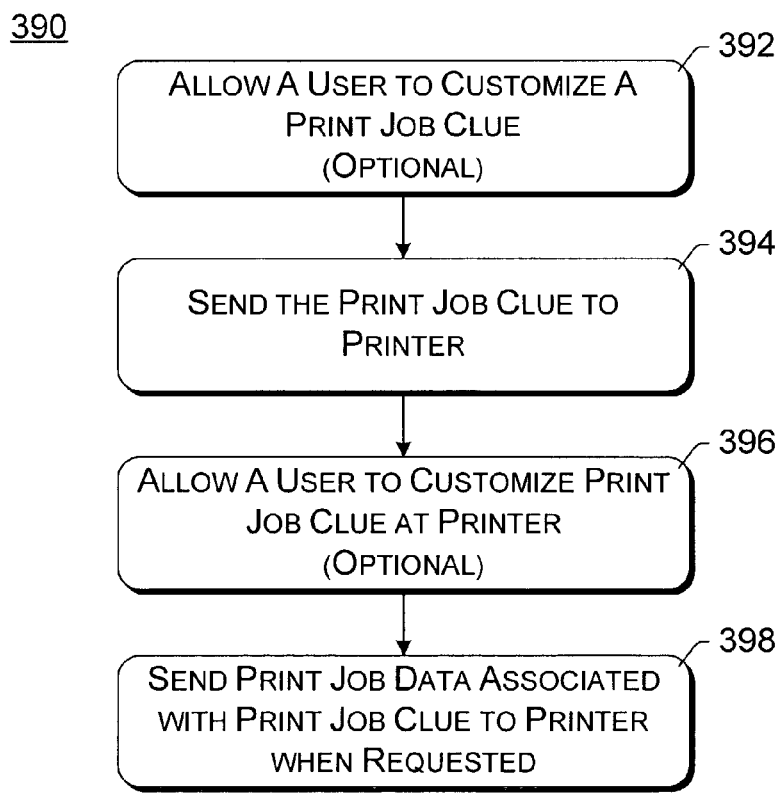
FIG. 11 is a flowchart illustrating an exemplary process for customizing print job clues.

FIG. 11 is a flowchart illustrating an exemplary process 390 for customizing print job clues. Process 390 can be implemented by a computer or by a computer and a printer. Process 390 can be implemented in software, firmware, hardware, or combinations thereof.

Initially, a user is optionally allowed to customize a print job clue (act 392). The print job clue (optionally already customized) is sent to the printer (act 394), and can optionally be further customized at the printer (act 396). The computer then sends the print job data associated with the customized print job clue to the printer when it is requested by the printer (act 398). Thus, the print job clue can be customized at the computer, at the printer, or at both the computer and the printer.

Figure 12:
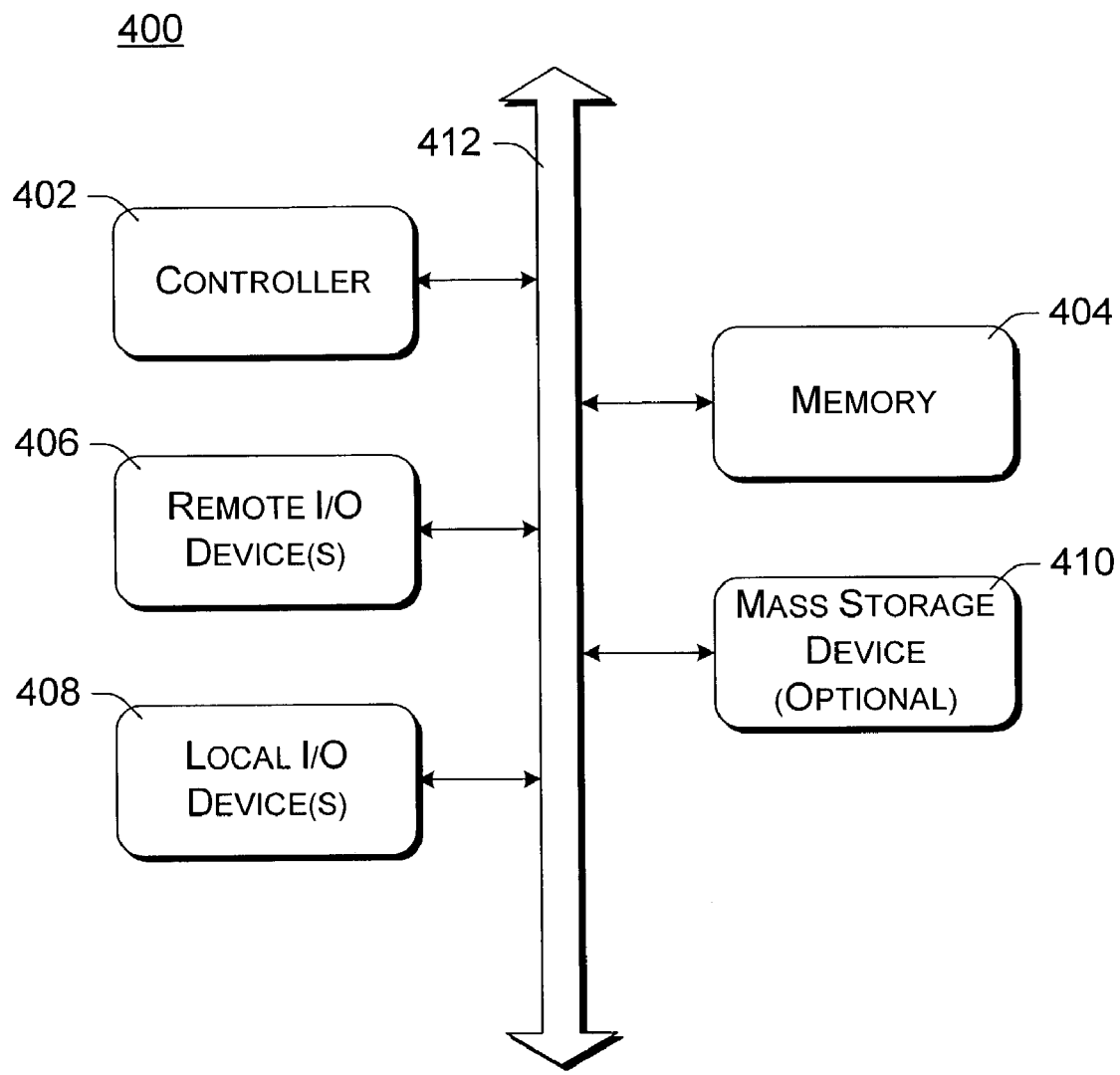
FIG. 12 illustrates portions of an exemplary device in additional detail.

FIG. 12 illustrates portions of an exemplary device 400 in additional detail. Device 400 can be, for example: a computer 102 or printer 104 of FIG. 1 or 2. Device 400 includes a processor or controller 402, a memory 404, a remote I/O device(s) 406, a local I/O device(s) 408, and an optional mass storage device 410, all coupled to a bus 412. Depending on the type of the device, various additional conventional components may also be typically included in device 400 (e.g., a printer will typically include a print engine, print media inputs and outputs, etc.).

Controller or processor 402 can be a general purpose microprocessor or a dedicated microcontroller (e.g., one or more Application Specific Integrated Circuits (ASICs) or programmable logic devices (PLDs)). Remote I/O device(s) 406 is one or more interface devices allowing components of device 400 (e.g., controller 402) to communicate with other devices external to device 400. Remote I/O device(s) 406 may include, for example, a modem, a network interface card (NIC), a parallel port, a serial port, a universal serial bus (USB) port, and so forth. Local I/O device(s) 408 is an interface device allowing local commands and/or data to be input to and/or output from device 400. Local I/O device(s) 408 may include, for example, a display device (e.g., liquid crystal display (LCD), light emitting diode (LED), etc.), a keypad (e.g., alphanumeric or otherwise), a touchscreen, a cursor control device (e.g., a trackpad, trackball, etc.), print media handlers and printing components (e.g., ink or toner dispensers), and so forth.

Bus 412 represents one or more buses in device 400, which may be implemented in accordance with public and/or proprietary protocols. The bus architecture can vary by device as well as by manufacturer. Mass storage device 410 is optional and represents any of a variety of conventional storage devices, such as fixed or removable magnetic or optical disks, Flash memory, etc.

Memory 404 represents volatile and/or nonvolatile memory used to store instructions and data for use by controller or processor 402. Typically, instructions are stored on a mass storage device 410 (or nonvolatile memory portion of memory 404) and loaded into a volatile memory portion of memory 404 for execution by controller or processor 402. Additional memory components may also be involved, such as cache memories internal or external to controller or processor 402. Various embodiments of the invention may be implemented, at different times, in any of a variety of computer readable media that is part of, or readable by, device 400. For example, such computer readable media may be mass storage device 410, memory 404, a cache memory, media (e.g., a magnetic or optical disk) accessible to device 400, and so forth.

Device 400 is exemplary only. It is to be appreciated that additional components (not shown) can be included in device 400 and some components illustrated in device 400 need not be included. For example, additional processors or storage devices, additional I/O interfaces, and so forth may be included in device 400, or mass storage device 410 may not be included.

Various discussions herein refer to components, modules, and processes that can be implemented in a printer or computer. It is to be appreciated that the components, modules, and processes described herein can be implemented in software, firmware, hardware, or combinations thereof. By way of example, a programmable logic device (PLD) or application specific integrated circuit (ASIC) could be configured or designed to implement various components and/or processes discussed herein.

Although the description above uses language that is specific to structural features and/or methodological acts, it is to be understood that the invention defined in the appended claims is not limited to the specific features or acts described. Rather, the specific features and acts are disclosed as exemplary forms of implementing the present invention.

The invention claimed is:

1. A method, implemented in a printer, the method comprising:

receiving, from a computer, a print job clue associated with a print job, wherein the print job clue includes information describing the print job;

determining, based on the information, whether the printer is currently configured to print the print job;

if the printer is currently configured to print the print job, then sending to the computer a request for print data associated with the print job;

if the printer is not currently configured to print the print job, then waiting until the printer is configured to print the print job before sending to the computer the request for the print data; and while waiting until the printer is configured to print the print job:

receiving, from the computer, another print job clue associated with another print job, wherein the other print job clue includes other information describing the other print job;

determining, based on the other information, whether the printer is currently configured to print the other print job;

if the printer is currently configured to print the other print job, then sending to the computer a request for the print data associated with the other print job; and if the printer is not currently configured to print the other print job, then waiting until the printer is configured to print the other print job before sending to the computer the request for the print data associated with the other print job.

2. A method as recited in claim 1, wherein the information describing the print job includes an indication of a print medium size on which the print data associated with the print job is to be printed.

3. A method as recited in claim 1, wherein the information describing the print job includes an indication of a print medium type on which the print data associated with the print job is to be printed.

4. A method as recited in claim 1, wherein the information describing the print job includes an indication of a password required to be entered by the user at the printer.

5. A method as recited in claim 1, wherein the information associated with the print job indicates that a particular printer destination bin will receive the print job and wherein the determining comprises:

checking whether the destination bin for the print job is full; and determining that the printer is not currently configured to print the print job if the destination bin for the print job is full.

6. A method as recited in claim 1, wherein the information associated with print job indicates a post processing component will be needed to print the print job and wherein the determining comprises:

checking whether the post-printing processing component is currently configured to process the print job; and determining that the printer is not currently configured to print the print job if the post-printing processing component is not currently configured to process the print job.

7. A method as recited in claim 6, wherein the post-printing processing component comprises a stapler, and wherein the checking comprises checking whether the stapler currently has staples.

8. A method, implemented in a printer, the method comprising:

receiving, from a computer, a print job clue associated with a print job, wherein the print job clue includes information describing the print job;

determining, based on the information, whether the printer is currently configured to print the print job;

if the printer is currently configured to print the print job, then sending to the computer a request for print data associated with the print job;

if the printer is not currently configured to print the print job, then waiting until the printer is configured to print the print job before sending to the computer the request for the print data; and while waiting until the printer is configured to print the print job:

receiving, from another computer, another print job clue associated with another print job, wherein the other print job clue includes other information describing the other print job;

determining, based on the other information, whether the printer is currently configured to print the other print job;

if the printer is currently configured to print the other print job, then sending to the other computer a request for the print data associated with the other print job; and if the printer is not currently configured to print the other print job, then waiting until the printer is configured to print the other print job before sending to the other computer the request for the print data associated with the other print job.

9. A method comprising:

receiving a plurality of print job clues each associated with one of a plurality of print jobs, wherein each print job clue includes information describing the associated print job;

modifying an order in which the print jobs are printed so that the print jobs are printed in an order other than an order in which the print job clues are received at the printer by waiting to print print jobs that exceed a threshold page count until a particular time of day, and wherein the page count of a print job is determined from information included in the print job clue associated with the print job;

requesting print data for a particular print job from a computer when the particular print job is to be printed; and reordering the printing of the print jobs based at least in part on one or more of an identity of at least one of a plurality of users submitting the print job clues, an estimate of the an amount of time to print at least one print job from the plurality of print jobs using the information included in the print job clue associated with the at least one print job, a page count of at least one of the print jobs determined from information included in the print job clue associated with the at least one print job, a print medium size used for at least one of the print jobs determined from information included in the print job clue associated with the at least one print job, and a print medium type used for at least one of the print jobs determined from information included in the print job clue associated with the at least one print job.

10. A method as recited in claim 9, further comprising:

storing, upon receipt, each of the plurality of print job clues in a clue queue; and wherein modifying the order comprises reordering the print job clues in the clue queue.

11. A method as recited in claim 9, wherein the plurality of print job clues are received from a plurality of computers.

12. One or more computer readable media having a plurality of instructions stored thereon that, when executed by one or more processors, causes a printer to:

receive, from a computer, a print job clue associated with a print job, wherein the print job clue includes information describing the print job;

determine, based on the information, whether the printer is currently configured to print the print job;

if the printer is currently configured to print the print job, then send to the computer a request for print data associated with the print job;

if the printer is not currently configured to print the print job, then wait until the printer is configured to print the print job before sending to the computer the request for the print data; and while waiting until the printer is configured to print the print job:

receive, from the computer, another print job clue associated with another print job, wherein the other print job clue includes other information describing the other print job;

determine, based on the other information, whether the printer is currently configured to print the other print job;

if the printer is currently configured to print the other print job, then send to the computer a request for the print data associated with the other print job; and if the printer is not currently configured to print the other print job, then wait until the printer is configured to print the other print job before sending to the computer the request for the print data associated with the other print job.

13. The computer readable media of claim 12, wherein the information describing the print job includes an indication of a print medium size on which the print data associated with the print job is to be printed.

14. The computer readable media of claim 12, wherein the information describing the print job includes an indication of a print medium type on which the print data associated with the print job is to be printed.

15. The computer readable media of claim 12, wherein the information describing the print job includes an indication of a password required to be entered by the user at the printer.

16. The computer readable media of claim 12, wherein the information associated with the print job indicates that a particular printer destination bin will receive the print job and wherein the instructions for causing the printer to determine comprise instructions for causing the printer to:

check whether the destination bin for the print job is full; and determine that the printer is not currently configured to print the print job if the destination bin for the print job is full.

17. The computer readable media of claim 12, wherein the information associated with print job indicates a post processing component will be needed to print the print job and wherein the instructions for causing the printer to determine comprise instructions for causing the printer to:

check whether the post-printing processing component is currently configured to process the print job; and determine that the printer is not currently configured to print the print job if the post-printing processing component is not currently configured to process the print job.

18. The computer readable media of claim 17, wherein the post-printing processing component comprises a stapler, and wherein the instructions causing the printer to check comprise instructions causing the printer to check whether the stapler currently has staples.

19. One or more computer readable media having a plurality of instructions stored thereon that, when executed by one or more processors, causes a printer to:
receive, from a computer, a print job clue associated with a print job, wherein the print job clue includes information describing the print job;
determine, based on the information, whether the printer is currently configured to print the print job;
if the printer is currently configured to print the print job, then send to the computer a request for print data associated with the print job;
if the printer is not currently configured to print the print job, then wait until the printer is configured to print the print job before sending to the computer the request for the print data; and
while waiting until the printer is configured to print the print job:
receive, from another computer, another print job clue associated with another print job, wherein the other print job clue includes other information describing the other print job;
determine, based on the other information, whether the printer is currently configured to print the other print job;
if the printer is currently configured to print the other print job, then send to the other computer a request for the print data associated with the other print job; and
if the printer is not currently configured to print the other print job, then wait until the printer is configured to print the other print job before sending to the other computer the request for the print data associated with the other print job.

20. One or more computer readable media having a plurality of instructions stored thereon that, when executed by one or more processors, causes the one or more processors to:
receive a plurality of print job clues each associated with one of a plurality of print jobs, wherein each print job clue includes information describing the associated print job;
modify an order in which the print jobs are printed so that the print jobs are printed in an order other than an order in which the print job clues are received at the printer by waiting to print jobs that exceed a threshold page count until a particular time of day, and wherein the page count of a print job is determined from information included in the print job clue associated with the print job;
request print data for a particular print job from a computer when the particular print job is to be printed; and
reorder the printing of the print jobs based at least in part on one or more of
an identity of at least one of a plurality of users submitting the print job clues,
an estimate of the an amount of time to print at least one print job from the plurality of print jobs using the information included in the print job clue associated with the at least one print job,
a page count of at least one of the print jobs determined from information included in the print job clue associated with the at least one print job,
a print medium size used for at least one of the print jobs determined from information included in the print job clue associated with the at least one print job, and
a print medium type used for at least one of the print jobs determined from information included in the print job clue associated with the at least one print job.

21. The computer readable media of claim 20, further comprising instructions for causing the processor(s) to:
store, upon receipt, each of the plurality of print job clues in a clue queue; and
wherein the instructions for causing the processor(s) to modify the order comprises instructions for causing the processor(s) to reorder the print job clues in the clue queue.

22. The computer readable media of claim 20, wherein the plurality of print job clues are received from a plurality of computers.

* * * * *